US008785795B2

(12) United States Patent
Zou

(10) Patent No.: US 8,785,795 B2
(45) Date of Patent: Jul. 22, 2014

(54) LAPTOP KEYBOARD STRUCTURE

(75) Inventor: Weimin Zou, Gaoyou (CN)

(73) Assignee: Jiangsu Transimage Technology Co., Ltd., Gaoyou (CN)

( * ) Notice: Subject to any disclaimer, the term of this patent is extended or adjusted under 35 U.S.C. 154(b) by 123 days.

(21) Appl. No.: 13/419,169

(22) Filed: Mar. 13, 2012

(65) Prior Publication Data

US 2013/0175150 A1 Jul. 11, 2013

Related U.S. Application Data

(63) Continuation of application No. PCT/CN2012/070246, filed on Jan. 11, 2012.

(30) Foreign Application Priority Data

Jan. 11, 2012 (CN) .......................... 2012 1 0006546

(51) Int. Cl.
*H01H 9/00* (2006.01)
(52) U.S. Cl.
USPC .......................................................... 200/314

(58) Field of Classification Search
USPC ......................................................... 200/5 A
See application file for complete search history.

(56) References Cited

U.S. PATENT DOCUMENTS

| | | | | |
|---|---|---|---|---|
| 6,672,782 B2 * | 1/2004 | Hsu | ............................... | 400/495 |
| 8,168,905 B2 * | 5/2012 | Yang | ............................. | 200/314 |
| 8,188,397 B2 * | 5/2012 | Miyashita et al. | ............ | 200/310 |
| 8,530,768 B2 * | 9/2013 | Hwa | ............................. | 200/310 |
| 2010/0089737 A1 * | 4/2010 | Tsai et al. | ..................... | 200/5 A |

* cited by examiner

*Primary Examiner* — Renee Luebke
*Assistant Examiner* — Lheiren Mae Caroc
(74) *Attorney, Agent, or Firm* — Rankin, Hill & Clark LLP

(57) ABSTRACT

The present invention discloses a laptop keyboard structure, comprising a base board, a membrane functioning as keys, silica gel keys, scissor-switches and keycaps, wherein the silica gel keys are directly attached to the base board, the keycaps are connected to the base board via the scissor-switches, and beneath the base board is disposed with the membrane, which is arranged with apertures for computer assembly. As the membrane provided in the invention is disposed beneath the base board, structure bores are not required to be arranged on the membrane to cooperate with the key slots, so that fewer structure bores are needed and the fabrication of the membrane is further simplified.

7 Claims, 2 Drawing Sheets

LAPTOP KEYBOARD STRUCTURE

FIELD OF THE INVENTION

The present invention relates to a laptop computer, more particularly to a laptop keyboard structure.

BACKGROUND OF THE INVENTION

Conventional laptop keyboards have a flexible printed circuit (FPC) board functioning as keys that are attached to a metal base board, which requires a plurality of structure bores to be disposed to cooperate with key slots, consequently the fabrication of circuit boards is complicated.

In accordance with the prior art, a luminous laptop keyboard is obtained by attaching a backlight module thereon, more specifically, the backlight module is composed of a metal based FPC board, a luminous source (i.e. LED lights) and other auxiliary materials such as a light guide plate, which are attached to the rear of a common keyboard. Such structure has disadvantages of high costs and thicker keyboard. In addition, as the luminous source needs a separate power supply and the computer motherboard needs a module to provide power and connections, accordingly, the space of the motherboard is largely occupied to some extent.

As shown in FIG. 1, a conventional luminous keyboard is a FPC board 1 functioning as keys and the FPC board is disposed on a base board 2. A light guide board 3 is disposed at the rear of the base board 2, silica gel keys 4 are directly attached to the FPC board 1 and keycaps 6 are connected with the base board 2 via scissor-switches 5.

SUMMARY OF THE INVENTION

In view of the above-described problems, it is one objective of the present invention to overcome the drawbacks that the FPC board is disposed on the base board. To achieve such objective, there is provided a laptop keyboard structure, which is capable of overcoming the drawbacks with respect to the thickness of the luminous keyboard and space limitation to achieve an extra-slim design. The thickness of the keyboard is reduced, less space is needed on the motherboard and auxiliary materials such as FPC and processes are saved.

The technical solution adopted in the invention is described as follows: A laptop keyboard structure, comprising a base board, a membrane functioning as keys, silica gel keys, scissor-switches and keycaps, wherein the silica gel keys are directly attached to the base board, the keycaps are connected to the base board via the scissor-switches, and beneath the base board is disposed with the membrane, which is arranged with apertures for computer assembly.

Since on the membrane is only disposed with apertures such as screw holes for computer assembly without any structure bores to be disposed to cooperate with the key slots, the power circuit layout is simplified, thus material loss is reduced and light attenuation caused by the structure bores on the light guide plate is avoided.

Preferably, the base board is made of an aluminum plate, an iron plate or an alloy plate.

Preferably, the membrane is disposed with a light guide plate to form a light guide module, on which light emitting diode (LED) lights are attached to provide light.

Preferably, the front side of the light guide module is formed by a light reflecting layer and an anti-dazzling layer, which are coated with black and white layers of printing ink. The first layer is white and applied to diffusely reflect the light produced by the light guide plate back to the light guide plate. On the white layer is coated with black color to prevent the light from passing through the white printing ink to the outside. Furthermore, the opposite side of the light guide module is formed by a luminous layer, which is coated with silver or gloss silver printing ink to facilitate light reflection of the light guide plate.

In accordance with the present invention, the laptop keyboard structure provided in the invention has advantages that it is only necessary to provide the screw holes for computer assembly rather than the bores to cooperate with the key slots because the membrane functioning as keys is disposed at the bottom of the base board, therefore the number of bores is largely reduced and the fabrication of circuit boards is further simplified.

In consideration of the fact that the membrane functioning as keys is disposed at the bottom of the base board, there is a possibility for the circuit board to be or not to be integrated with the light guide plate. Consequently it is possible to take account of the feasibility for a slim design in a more comprehensive manner.

In accordance with the present invention, the circuit board can be integrated with the light guide plate, on which conductive circuits are disposed to achieve pressed key function and which is attached with LED lights to provide light. The front side of the light guide module can be added with a light reflecting layer and an anti-dazzling layer while the rear side is added with a luminous layer. The luminous elements are directly employed to provide the light guide plate with light. Consequently, the back light plates, power circuits and anti-dazzling screens are not required in the invention, so are the elements for light supply on the computer motherboard. In addition, there is no need to increase the thickness of the laptop so as to achieve luminous keyboards, so that the laptop can be designed with extra slim design of laptops from the aspect of keyboard components.

DETAILED DESCRIPTION OF THE EMBODIMENT

The present invention is explained in further detail below with reference to the attached drawings and examples.

Figure 1:
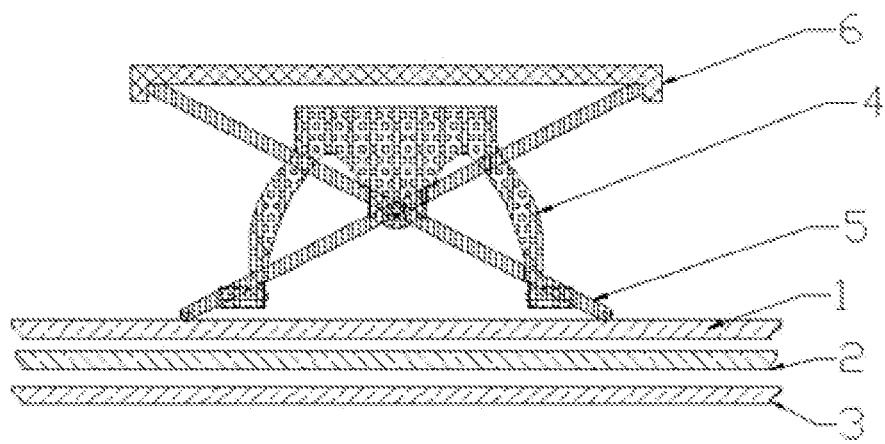
FIG. 1 is a structural representation of a laptop computer with luminous keyboards in accordance with the prior art.
Figure 2:
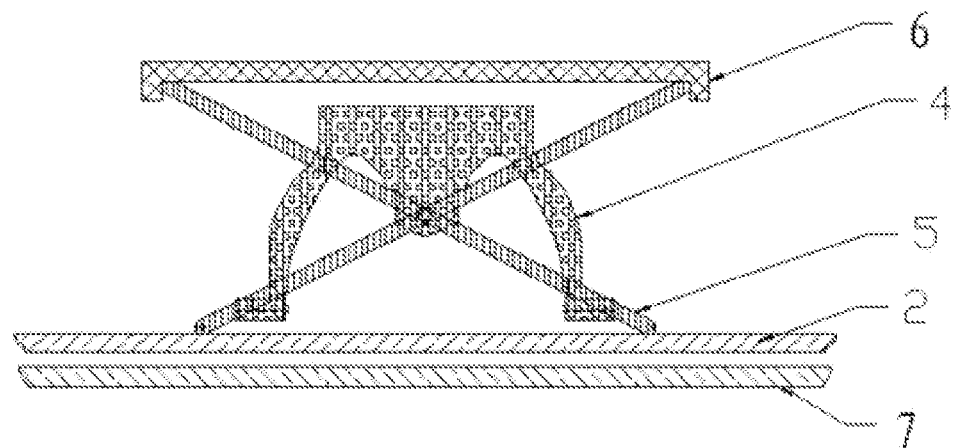
FIG. 2 is a structural representation of a laptop with luminous keyboards in accordance with the present invention.
Figure 3:
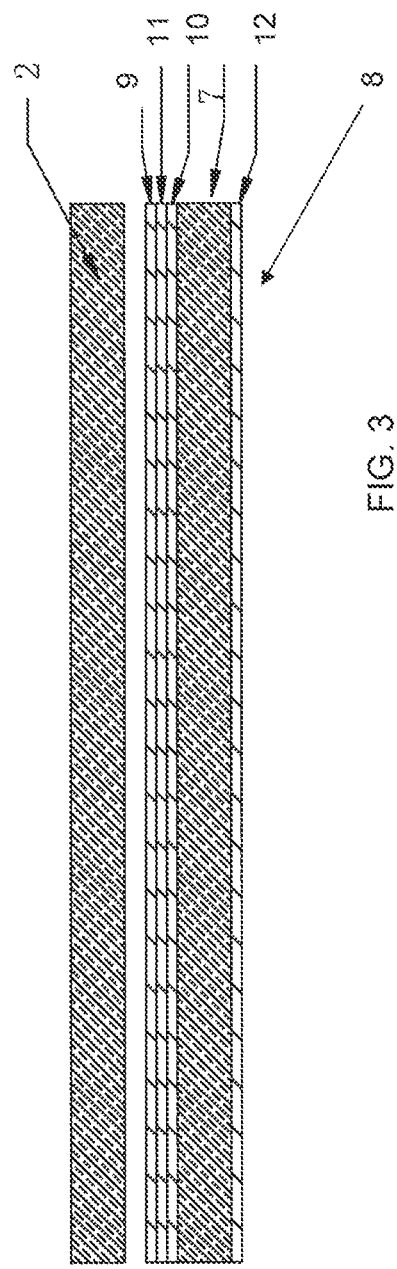
FIG. 3 is a partial enlarged view of FIG. 2.

As shown in FIGS. 2 and 3, a laptop keyboard structure in accordance with the present invention, comprising a base board 2, a membrane 8 functioning as keys, silica gel keys 4, scissor-switches 5 and keycaps 6, wherein the silica gel keys 4 are directly attached to the base board 2, the keycaps 6 are connected to the base board 2 via the scissor-switches 5, and beneath the base board 2 is disposed with the membrane, which is arranged with apertures for computer assembly.

The base board 2 is made of an aluminum plate, an iron plate or an alloy plate.

The membrane 8 is disposed with a light guide plate to form a light guide module 7, on which light emitting diode (LED), lights 9 are attached to provide light. The front side of said light guide module 7 is formed by a light reflecting layer 10 and an anti-dazzling layer 11, which are coated with black and white layers of printing ink, while the opposite side of the light guide module is formed by a luminous layer 12, which is coated with silver or gloss silver printing ink.

It should be noted that the present invention is not limited to the above detailed description and the embodiments. People who are skilled in the related art can make any improvement and modifications based on the above detailed description without departing from the spirit of the invention. All unmentioned parts in this embodiment can be achieved in accordance with the prior art.

The invention claimed is:

1. A laptop keyboard structure, comprising:
   a base board having silica gel keys directly connected thereto;
   keycaps engaging the silica gel keys and connected to the base board via scissor-switches; and
   a membrane disposed beneath the base board and functioning as keys, the membrane including:
   a light guide module having a front side facing the base board and an opposite rear side,
   a light reflecting layer and anti-dazzling layer disposed on the front side of the light guide module,
   light emitting diode lights disposed over the light reflecting layer and anti-dazzling layer to provide light to the base board, and
   a luminous layer disposed on the rear side of the light guide module.

2. The laptop keyboard structure according to claim 1, wherein the base board is made of an aluminum plate, an iron plate or an alloy plate.

3. The laptop keyboard structure according to claim 1, wherein the membrane is disposed with a light guide plate to form the light guide module, on which the light emitting diode lights are attached to provide light.

4. The laptop keyboard structure according to claim 3, wherein the light reflecting layer and an anti-dazzling layer are coated with black and white layers of printing ink, while the luminous layer is coated with silver or gloss silver printing ink.

5. The laptop keyboard structure according to claim 1, wherein the light reflecting layer and anti-dazzling layer are coated with black and white layers of printing ink, and the luminous layer is coated with silver or gloss silver printing ink.

6. The laptop keyboard structure according to claim 1, wherein the light emitting diode lights are disposed immediately beneath the base board without an intervening substrate.

7. The laptop keyboard structure according to claim 1 wherein the membrane is disposed immediately beneath the base board without a separate intervening substrate.

* * * * *